United States Patent [19]
Takahashi

[11] Patent Number: 5,278,766
[45] Date of Patent: Jan. 11, 1994

[54] NUMERICAL CONTROLLED DEVICE AND NUMERICALLY CONTROLLED MACHINE TOOL

[75] Inventor: Yoshikatsu Takahashi, Nagoya, Japan

[73] Assignee: Mitsubishi Denki Kabushiki Kaisha, Tokyo, Japan

[21] Appl. No.: 742,395

[22] Filed: Aug. 8, 1991

[30] Foreign Application Priority Data

Aug. 9, 1990 [JP] Japan ................................. 2-211360

[51] Int. Cl.$^5$ ............................................ G06F 15/46
[52] U.S. Cl. ............................ 364/474.14; 364/180; 364/474.23; 364/474.31
[58] Field of Search ............ 364/474.23, 474.11, 364/474.14, 474.15, 474.2, 474.21, 474.31, 474.32, 474.34, 474.35, 160, 180–; 318/625, 590-91

[56] References Cited

U.S. PATENT DOCUMENTS

| | | | |
|---|---|---|---|
| 5,083,071 | 1/1992 | Sasaki et al. | 364/474.23 |
| 5,084,660 | 1/1992 | Sasaki et al. | 364/474.23 |
| 5,181,178 | 1/1993 | Sasaki et al. | 318/625 |

FOREIGN PATENT DOCUMENTS

| | | |
|---|---|---|
| 413823 | 9/1989 | European Pat. Off. |
| 3902460 | 8/1989 | Fed. Rep. of Germany |
| 62-176733 | 8/1987 | Japan |

*Primary Examiner*—Jerry Smith
*Assistant Examiner*—Thomas E. Brown
*Attorney, Agent, or Firm*—Rothwell, Figg, Ernst & Kurz

[57] ABSTRACT

The program for a numerical control device for controlling a numerically controlled lathe includes translation commands for translating the tool and the machining mode switching commands for switching between the normal mode by which only the tool is translated and the Swiss mode by which both the tool and the work are translated. A machining program analyzer unit analyses the program commands into translation commands and the machining mode switching commands. In response to the machining mode switching commands, the interpolation data generator unit converts the commands for translating the tool two-dimensionally into translation data for the tool along a first axis and a translation data for the work along a second axis. Thus, the programming for the machine tool capable of operating both in the normal and the Swiss mode is made easier.

4 Claims, 8 Drawing Sheets

NUMERICAL CONTROLLED DEVICE AND NUMERICALLY CONTROLLED MACHINE TOOL

BACKGROUND OF THE INVENTION

This invention relates to numerically controlled machine tools and numerical control devices, and more particularly to those by which the work is machined by moving the tool and the work in accordance with the machining programs for controlling the movement of the tool with respect to the work.

Figure 7:
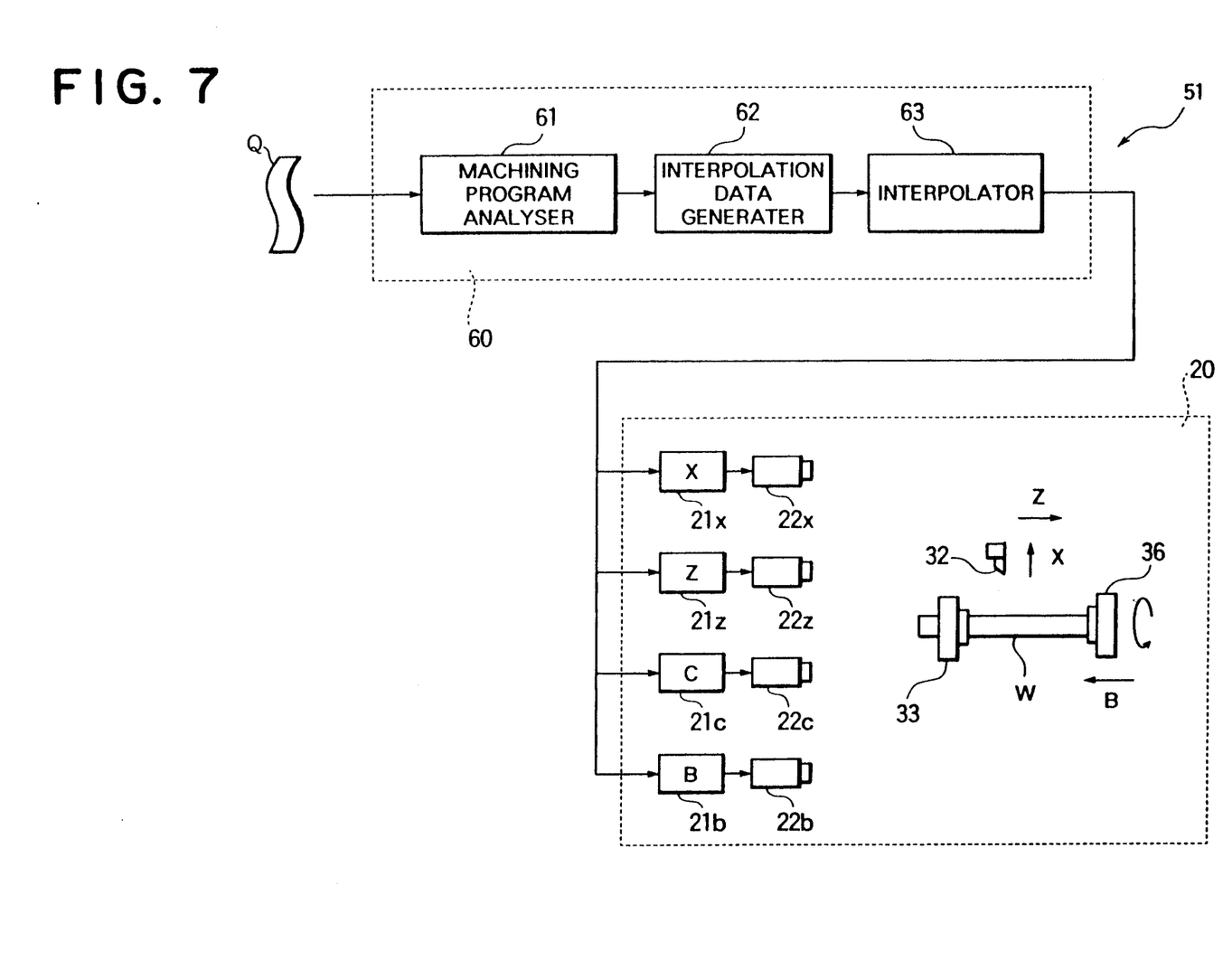
FIG. 7 is a block diagram showing schematically the organization of a conventional numerically controlled lathe.

FIG. 7 is a block diagram showing schematically the organization of a conventional numerically controlled lathe. The numerically controlled lathe 51 consists of a lathe device 20 and a numerical control device 60. The tool 32 of the lathe device 20 can be translated along the X-axis and the Z-axis running perpendicular to each other. In FIG. 7, the arrows at reference characters X and Z represent the positive directions of the X-axis and Z-axis, respectively. The work W is held by a main spindle 33 and/or an auxiliary spindle 36. The work W can be translated along the B-axis running parallel to the Z-axis. The arrow at reference character B represents the positive direction of the B-axis.

The translation along the X-axis is effected by an amplifier 21x and a motor 22x. The translation along the Z-axis is effected by an amplifier 21z and a motor 22z. The translation along the C-axis (not shown) is effected by an amplifier 21c and a motor 22c. The translation along the B-axis is effected by an amplifier 21b and a motor 22b.

The numerical control device 60 includes: a machining program analyzer unit 61 for reading thereinto a machining program Q prepared by an operator and then analyzing the commands thereof; a interpolation data generator unit 62 for generating the interpolation data which is necessary for translating the respective axes of the lathe device 20 in accordance with the commands of the machining program Q analyzed by the machining program analyzer unit 61; and an interpolator unit 63 which translates the axes of the lathe device 20 in accordance with the interpolation data obtained by the interpolation data generator unit 62.

Figure 8:
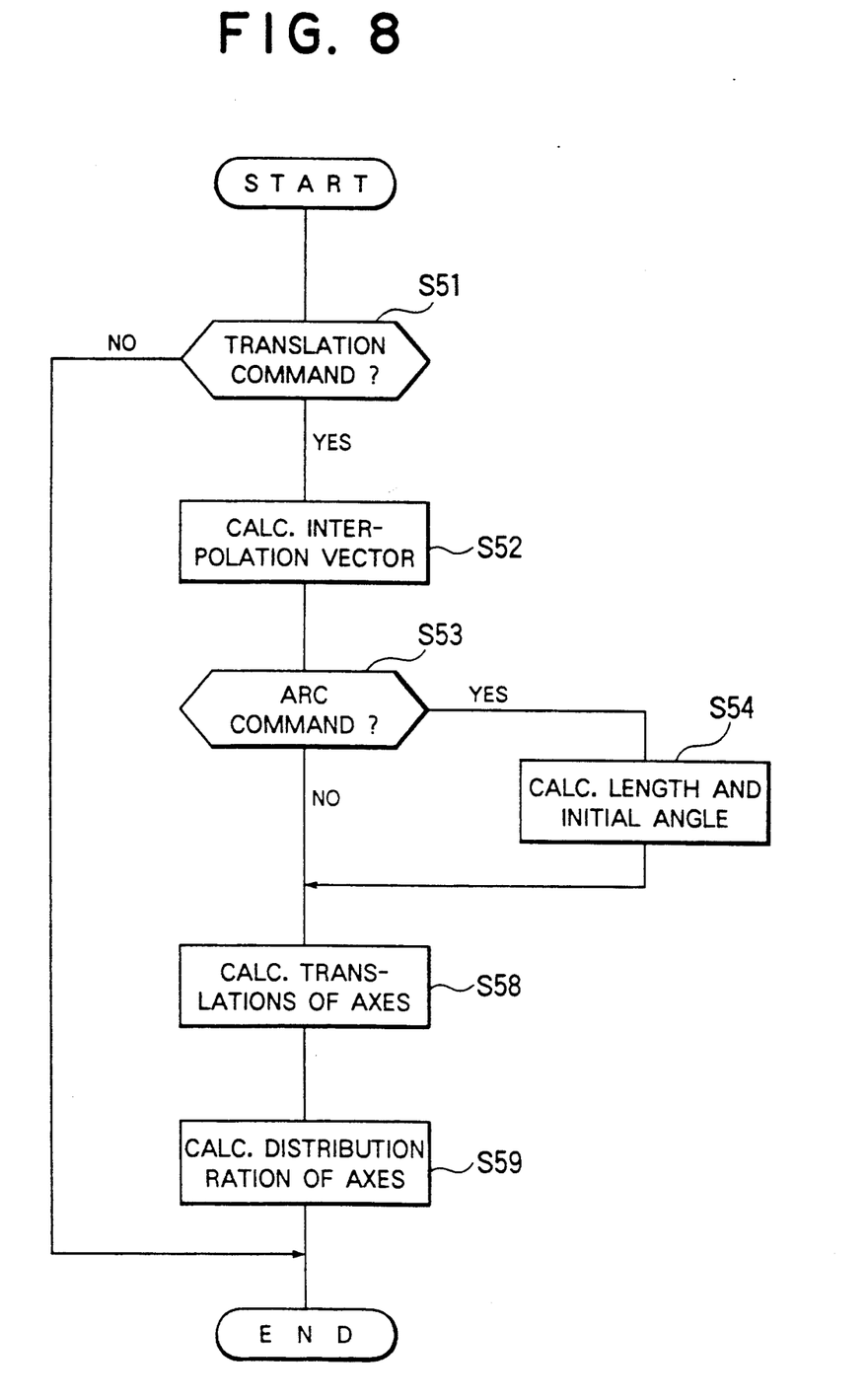
FIG. 8 is a flowchart showing the interpolation data generation executed by the interpolation data generator unit.

FIG. 8 is a flowchart showing the interpolation data generation executed by the interpolation data generator unit. At step S51, the interpolation data generator unit 62 judges whether or not the command obtained by an analysis of the machining program Q is a translation command. If the judgment is affirmative, the interpolation vector is calculated at step S52 in accordance with the command; if the judgment is negative, nothing is done. Next, at step S53, judgment is made whether or not the command is an arc command. If the judgment is affirmative, the arc length and the initial machining angle is calculated in accordance with the command at step S54. After the arc length and the initial machining angle is calculated—or immediately after step S53 if the judgment is negative thereat—the magnitudes of translations are calculated at step S58. Further, at step S59, the distribution ratio (described below) for the respective axes are calculated.

Figure 9:
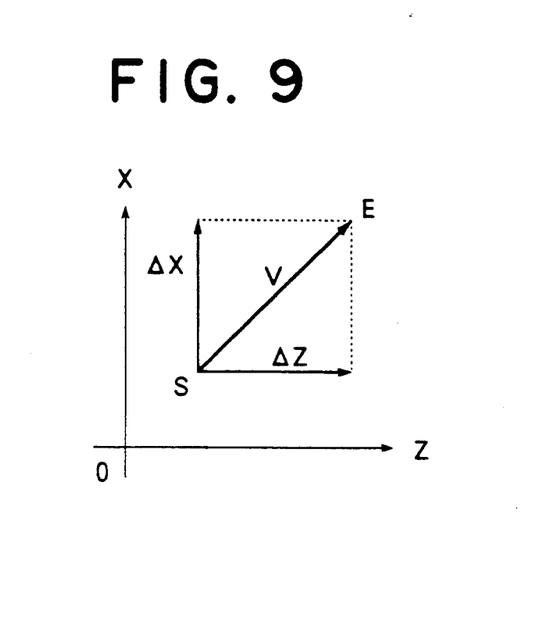
FIG. 9 is a diagram for explaining the interpolation data in the case where a linear translation command is given.

FIG. 9 is a diagram for explaining the interpolation data in the case where a linear translation command is given. The command is that the tool 32 be translated linearly from an initial point S (Xs, Zs) to an end point E (Xe, Ze). The interpolation vector is represented by V, while the amounts of translations along the X-axis and the Z-axis are represented by $\Delta X$ and $\Delta Z$, respectively. Thus, $$\Delta X = Xe - Xs$$

$$\Delta Z = Ze - Zs$$

On the other hand, the amounts of translation along the B-axis, $\Delta B$, is null:

$$\Delta B = 0$$

Thus, the distribution ratios: Sx, Sz, and Sb, for the X-axis, Z-axis, and B-axis are:

$$Sx = \Delta X / Lv$$

$$Sz = \Delta Z / Lv$$

$$Sb = 0$$

where Lv is the length of the interpolation vector V:

$$Lv^2 = (Xe - Xs)^2 + (Ze - Zs)^2$$

Figure 10:
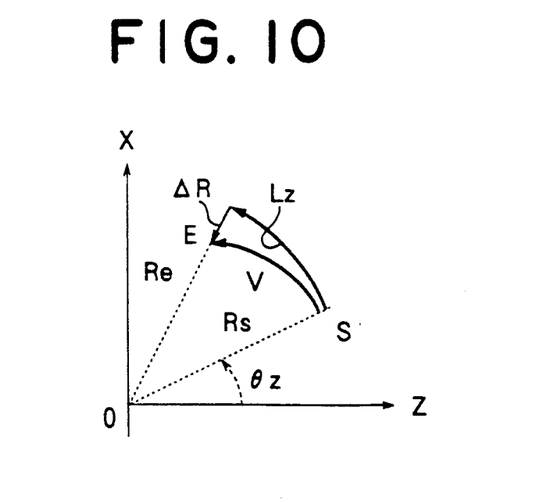
FIG. 10 is a diagram for explaining the interpolation data in the case where an arc translation command is given.

Under the above circumstance, the machining program Q is given, for example, by:

G00XXsZZs;

G01XXeZZeFf;

FIG. 10 is a diagram for explaining the interpolation data in the case where an arc translation command is given. The command is that the tool 32 be translated along an arc from an initial point S (Xs, Zs) to an end point E (Xe, Ze), where: Lz is an arc length; $\theta z$ is the initial angle; Rs is the initial radius; Re the end (final) radius; and $\Delta R$ is the difference between the initial and the final radii. Thus, the amounts of translations $\Delta X$, $\Delta Z$, and $\Delta B$ along the X-axis, Z-axis, and B-axis, are the same as in the case of the linear translation:

$$\Delta X = Xe - Xs$$

$$\Delta Z = Ze - Zs$$

$$\Delta B = 0$$

Thus, the distribution ratios: Sx, Sz, and Sb, along the X-axis, Z-axis, and B-axis are:

$$Sx = \Delta X / Lv$$

$$Sz = \Delta Z / Lv$$

$$Sb = 0$$

where the length Lv of the interpolation vector V is given by:

$$Lv^2 = Lz^2 + \Delta R^2$$

The distribution ratios Sl and Sr for the arc length Lz and the radial difference $\Delta R$ are given by:

$$Sl = Lz / Lv$$

$$Sr = \Delta R / Lv$$

Under the above circumstance, the machining program Q is given, for example, by:

G00XXsZZs;

G01XXeZZeIXoKZoFf;

Usually, the numerically controlled lathe 51 effects machining by translating the tool 32 along the X-axis and the Z-axis. It is exceptional that the work W is translated along the B-axis. Thus, the arc movement commands can be executed by means of the former method of operation (i.e., the translation of the tool 32), but not by means of the latter method of operation (i.e., the translation of the work W).

Figure 11:
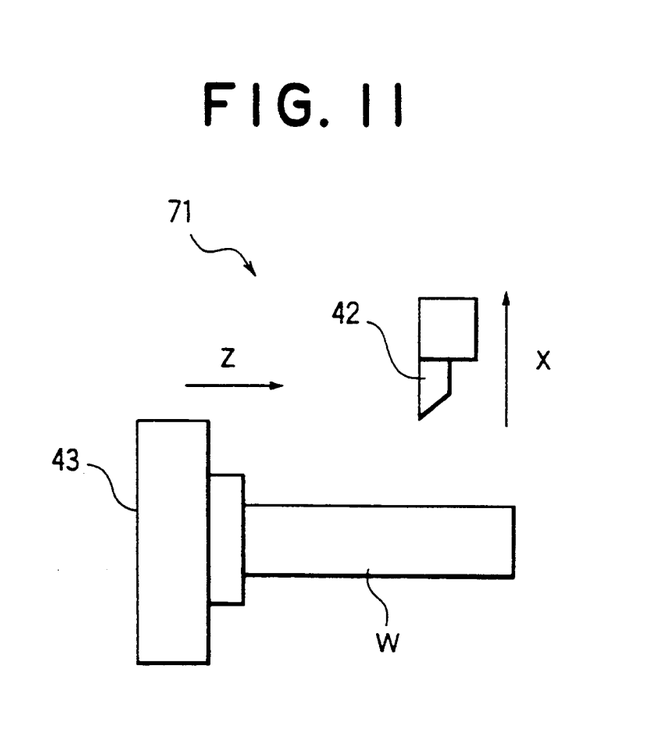
FIG. 11 shows schematically another conventional numerically controlled lathe.

FIG. 11 shows schematically another conventional numerically controlled lathe. In the case of this numerically controlled lathe 71, the machining program is prepared as though the tool 42 were moved along the X-axis and the Z-axis. Actually, however, the tool 42 is moved along the X-axis only, the work W being translated along the Z-axis by means of the spindle 43.

Another related prior art is a machining center provided with a machining unit which is disclosed in Japanese Laid-Open Patent (Kokai) No. 62-176733. In the case of this machining center, two tools are utilized in machining. A first tool moves along mutually perpendicular first and second axes, and a second tool moves along a third axis parallel to the second axis. It is possible to machine the work by translating the second tool along the third axis in accordance with the translation command for translating the first tool along the first axis.

The conventional numerically controlled lathe 51 of FIG. 7 has the following disadvantage. When the tool 32 is translated along the X-axis and the work W is translated along the B-axis in order to machine the work W, the operator must prepare the program by calculating the amounts of translations via the X-axis/B-axis system, which involves the movements of both the tool 32 and the main spindle 33 and thus is burdensome for the operator. Further, arc commands cannot be used.

The conventional numerically controlled lathe 71 of FIG. 11 has the following disadvantage. Since it is not possible to machine the work W by solely translating the tool 42 two-dimensionally without translating the work W, some kinds of works W cannot be machined in accordance with their dimensional specifications.

Further, the machining center disclosed in Japanese Laid-Open Patent (Kokai) No. 62-176733 has the following disadvantage. The tool utilized in machining changes from the first to the second tool during the machining operation. Thus, when it is desirable to machine the work by a single tool, this machining center cannot be used.

SUMMARY OF THE INVENTION

It is therefore an object of this invention to provide a numerically controlled machine tool and a numerical control device by which the work can be machined by solely translating the tool along the X-axis/Z-axis system (movements along the X-axis and the Z-axis), and by which, where necessary, an easy-to-prepare machining program prepared with respect to the X-axis/Z-axis system and allowing uses of arc commands can be utilized in machining the work along the X-axis/B-axis system.

The above object is accomplished in accordance with the principle of this invention by a numerical control device operated by a machining program for controlling a numerically controlled machine tool which includes a tool translatable along a first and a second axis and by which a work is translatable along a third axis running parallel to the second axis, said machining program containing translation commands for translating the tool, and machining mode switching commands for switching between a first mode by which only the tool is translated along the first and the second axes, and a second mode by which the tool is translated along the first axis while the work is translated along the third axis, said numerical control device comprising:

program analyzer means for analyzing a machining program into said translation commands and said machining mode switching commands;

interpolation data generator means for generating translation data of the tool and/or the work along respective axes, said interpolation data generator means converting, in response to a machining mode switching command for switching from said first to said second mode, the translation commands for translating the tool along the first and the second axes into translation data of the tool along the first axis and the translation data of the work along the third axis, said interpolation data generator terminating the conversion upon receiving a machining mode switching command for switching from said second to said first mode; and driver means for driving the numerically controlled machine tool in accordance with the translation data obtained by said interpolation data generator.

The machining program may include linear translation commands for translating the tool along a linear path, and arc movement commands for translating the tool along an arc. The numerically controlled machine tool may be a numerically controlled lathe.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
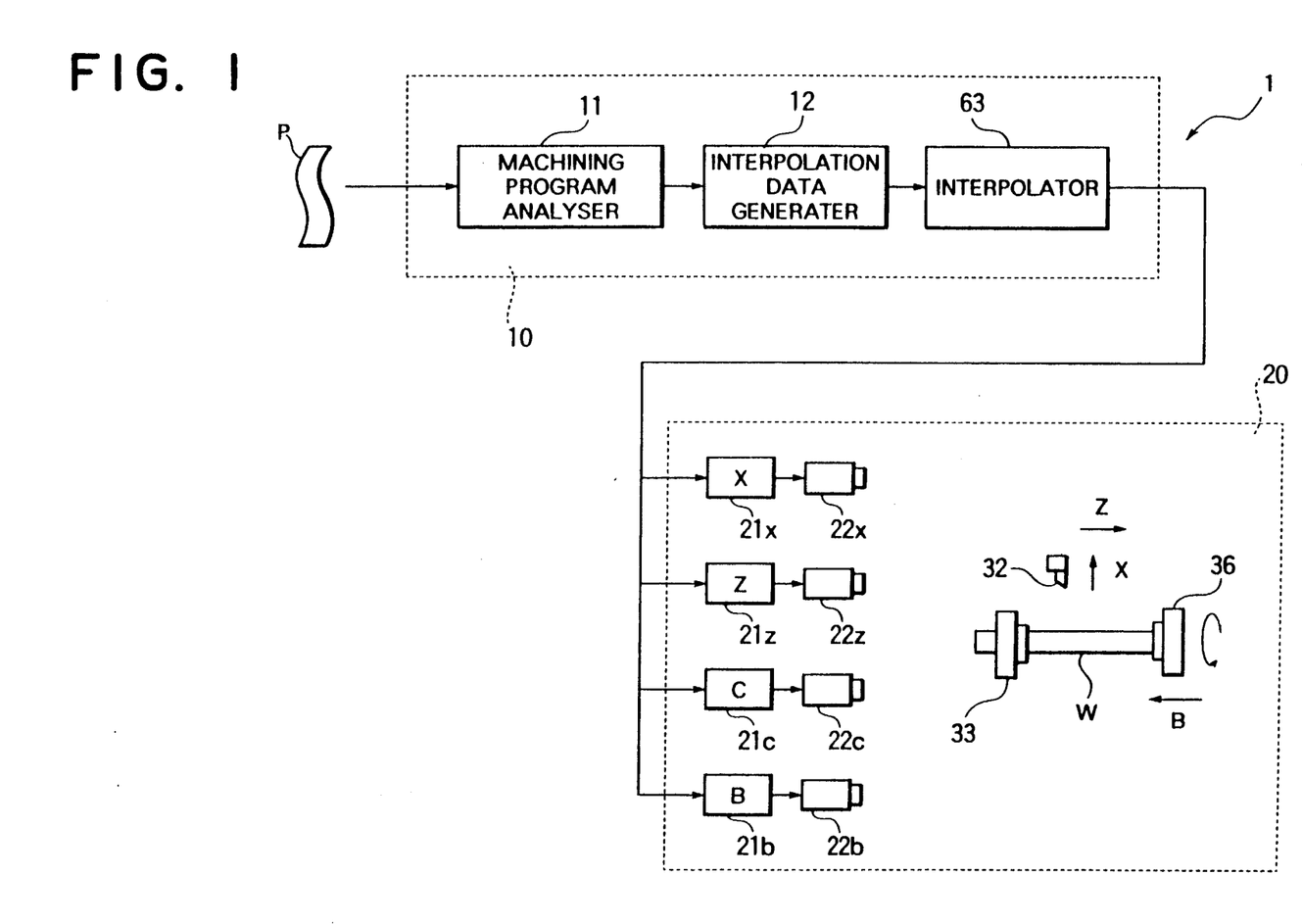
FIG. 1 is a block diagram showing schematically the organization of a numerically controlled lathe according to this invention.

FIG. 1 is a block diagram showing schematically the organization of a numerically controlled lathe according to this invention. The numerically controlled lathe 1 consists of the lathe device 20 and the numerical control device 10. The lathe device 20 is similar to that of FIG. 7 described above. Thus, the tool 32 of the lathe device 20 can be translated along the X-axis and the Z-axis running perpendicular to each other. In FIG. 7, the arrows at reference characters X and Z represent the positive directions of the X-axis and Z-axis, respectively. The work W is held by a main spindle 33 and/or an auxiliary spindle 36. The work W can be translated along the B-axis running parallel to the Z-axis. The arrow at reference character B represents the positive direction of the B-axis.

The translation along the X-axis is effected by an amplifier 21x and a motor 22x. The translation along the Z-axis is effected by an amplifier 21z and a motor 22z. The translation along the C-axis (not shown) is effected by an amplifier 21c and a motor 22c. The translation along the B-axis is effected by an amplifier 21b and a motor 22b.

The numerical control device 10 includes: a machining program analyzer unit 11 for reading thereinto a machining program P prepared by an operator and analyzing the commands thereof; a interpolation data generator unit 12 for generating the interpolation data which is necessary for translating the respective axes of the lathe device 20 in accordance with the commands of the machining program analyzed by the machining program analyzer unit 11; and an interpolator unit 63 which translates the axes of the lathe device 20 in accordance with the interpolation data obtained by the interpolation data generator unit 12.

The machining program P may include "machining mode switching command" for switching between two modes: the normal mode (shown in FIG. 5) where the tool 32 is translated via the X-axis and Z-axis; and the Swiss machining mode (shown in FIG. 6) where the tool 32 is translated via the X-axis while the work W is translated via the B-axis in order to machine the work W. Further, the translation commands for the Swiss mode can be programmed just as those for the normal mode, as described below. The machining program analyzer unit 11 includes, in addition to the functions of the conventional machining program analyzer unit 61, the function of analyzing the machining mode switching commands.

Figure 2:
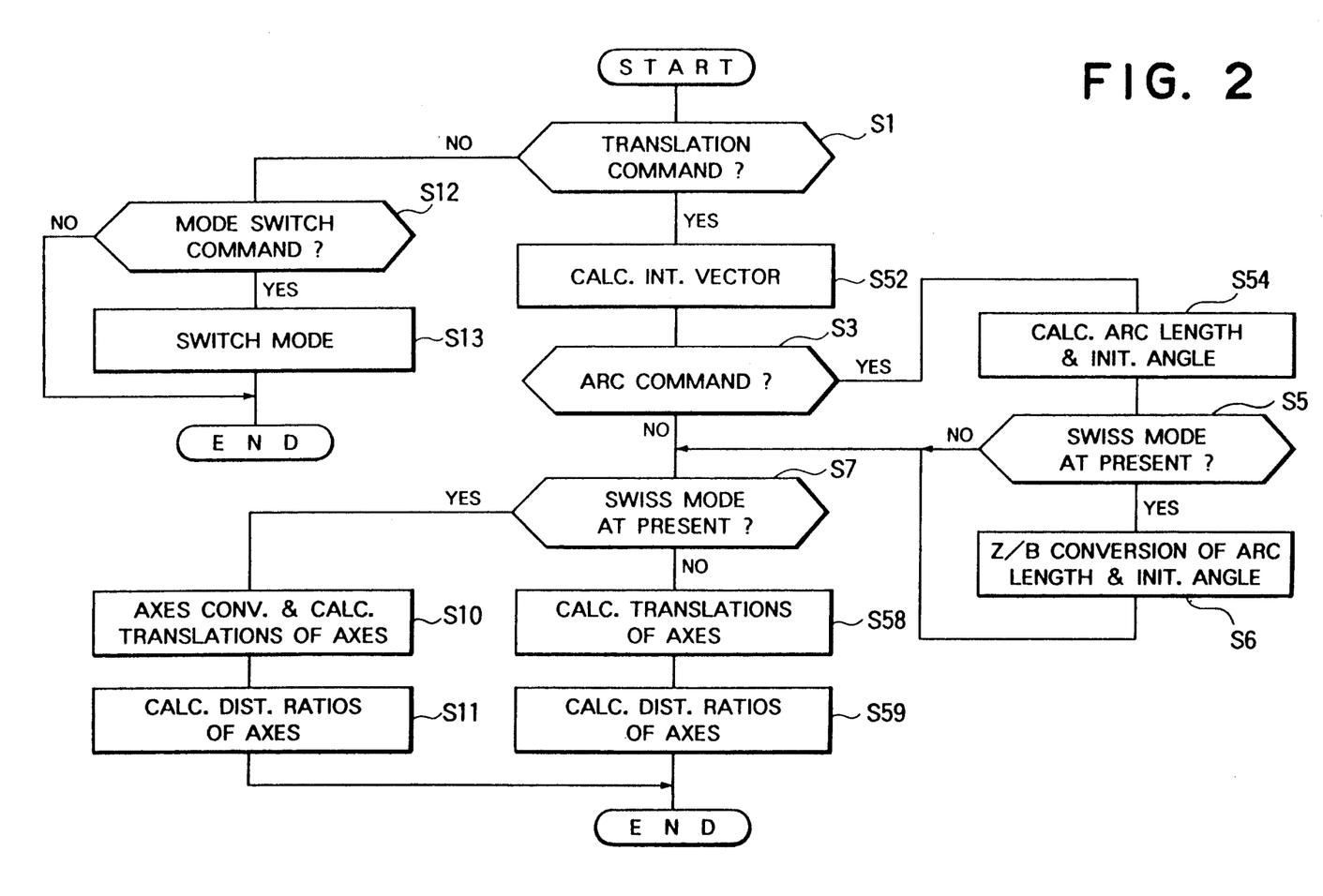
FIG. 2 is a flowchart showing the operation procedure of the interpolation data generator unit of FIG. 1.

FIG. 2 is a flowchart showing the operation procedure of the interpolation data generator unit of FIG. 1. First, at step S1, the interpolation data generator unit 12 judges whether or not the command obtained by analyzing the machining program P is a translation command. If the judgment is negative, the execution proceeds to step S12; if the judgment is affirmative, the interpolation vector is calculated at step S52 in accordance with the command.

At step S3 subsequent to step S52, judgement is made whether or not the command is an arc movement command. If the judgment is negative, the execution proceeds to step S7; if the judgment is affirmative, the arc length Lz and the initial machining angle $\theta z$ of the normal mode are calculated in accordance with the command at step S54. The process by which the arc length Lz and the initial angle $\theta z$ are calculated is the same as in the case of the conventional device.

At step S5 subsequent to step S54, judgment is made whether or not the Swiss machining mode is currently selected or not. If the judgment is negative, the execution proceeds to step S7; if the judgment is affirmative, the arc length Lz and the initial angle $\theta z$ of the normal mode as obtained above are converted into the arc length Lb and the initial angle $\theta b$ of the Swiss machining mode at step S6, as described below. Thereafter, the execution proceeds to step S7.

At step S7, judgment is made whether or not the Swiss machining mode is selected at present. If the judgment is affirmative, the execution proceeds to step S10; if the judgment is negative, the amounts of translation of respective axes according to the normal mode are calculated at step S58. The process by which the amounts of translation of the respective axes are calculated is the same as in the case of the conventional device.

At step S59 subsequent to step S59, the distribution ratios of the respective axes are calculated. The process by which the distribution ratios of the respective axes are calculated is the same as in the case of the conventional device.

At step S10, the translation command according to the normal mode described in the machining program P is subjected to the axes conversion to obtain the amounts of translation of the respective axes according to the Swiss machining mode. Further, at step S11, the distribution ratios of the respective axes according to the Swiss machining mode are calculated, as described below.

At step S12, judgment is made whether or not the command is a machining mode switching command. If the judgment is affirmative, the machining mode is switched at step S13 to the mode instructed by the command; if the judgment is negative, the procedure of FIG. 2 is terminated immediately.

Figure 3:
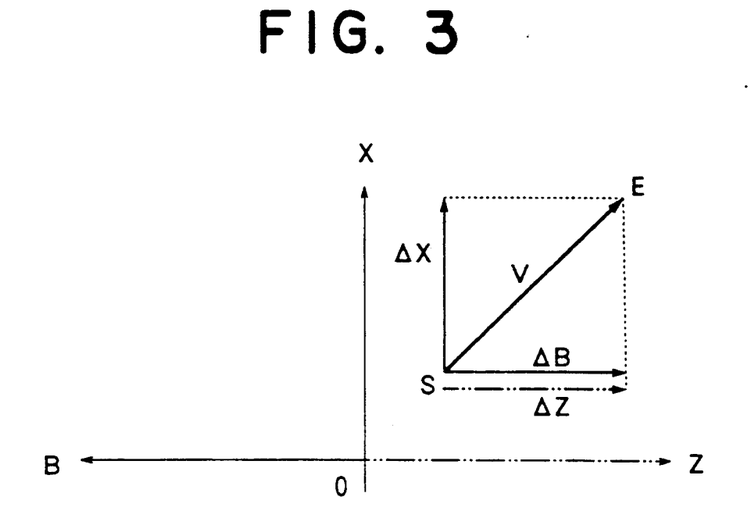
FIG. 3 is a diagram for explaining the interpolation data in the case where a linear translation command according to the normal mode is executed via the Swiss machining mode.

FIG. 3 is a diagram for explaining the interpolation data in the case where a linear translation command according to the normal mode is executed via the Swiss machining mode. According to the normal mode, the tool 32 is to be translated from the initial point S(Xs, Zs) to the end point E(Xe, Ze). Thus, the interpolation vector V according to the Swiss machining mode has the X-axis component $\Delta X$ (translation along the X-axis) and the B-axis component $\Delta B$ (translation along the B-axis), such that:

$$\Delta X = Xe - Xs$$

$$\Delta B = -(Ze - Zs)$$

and the translation $\Delta Z$ via the Z-axis is null:

$$\Delta Z = 0$$

Thus, the distribution ratios Sx, Sb, Sz for the X-axis, B-axis, and Z-axis, respectively, are:

$Sx = \Delta X/Lv$ $Sb = \Delta B/Lv$ $Sz = 0$ where the Lv is the length of the interpolation vector V:

$Lv^2 = (Xe - Xs)^2 + (Ze - Zs)^2$

The machining program P under the above circumstance may be exemplified by:

G00XXsZZs;

G120;

G01XXezzEFf;

G121;

where "G120" is the machining mode switching command to switch from the normal to the Swiss mode, and "G121" is machining mode switching command to switch from the Swiss machining mode to the normal.

Thus, if the machining mode switching commands "G120" and the "G121" are not inserted, the machining operation according to the machining program P is the same as that according to the normal mode described by reference to FIG. 9 in the introductory part of this specification.

Figure 4:
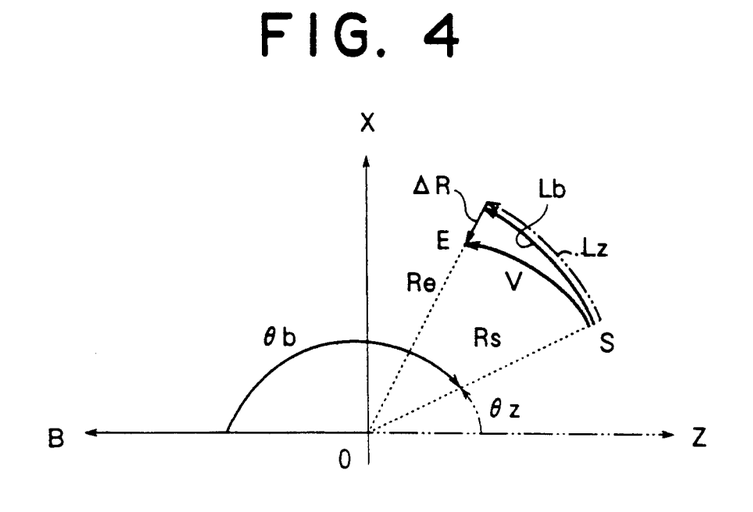
FIG. 4 is a diagram for explaining the interpolation data in the case where an arc movement command according to the normal mode is executed via the Swiss machining mode.

FIG. 4 is a diagram for explaining the interpolation data in the case where an arc movement command according to the normal mode is executed via the Swiss machining mode. According to the normal mode, the tool 32 is to be moved along an arc from the initial point S(Xs, Zs) to the end point E(Xe, Ze). Lz is the arc length and $\theta z$ is the initial angle according to the normal mode. In accordance with the Swiss machining mode, Lb is the arc length, $\theta b$ is the initial machining angle, Rs is the initial radius, Re is the final radius, $\Delta R$ is the radial difference of the initial point S and the end point E.

Thus, amounts of translation $\Delta X$, $\Delta B$, and $\Delta Z$ along the X-axis, B-axis, and Z-axis are the same as in the case of the linear translation shown in FIG. 3:

$\Delta X = Xe - Xs$ $\Delta B = -(Ze - Zs)$ $\Delta Z = 0$

Thus, the distribution ratios Sx, Sb, Sz for the X-axis, B-axis, and Z-axis, respectively, are:

$Sx = \Delta X/Lv$ $Sb = \Delta B/Lv$ $Sz = 0$ where the Lv is the length of the interpolation vector V, which is given by:

$Lv^2 = Lz^2 + \Delta R^2$

The arc length Lb and the initial angle $\theta b$ according to the Swiss machining mode are:

$Lb = -Lz$ $\theta b = 180° - \theta z$

The distribution ratios Sl and Sr for the arc length Lb and the radial difference $\Delta R$ are given by:

$Sl = Lz/Lv$ $Sr = \Delta R/Lv$

The machining program P under the above circumstance may be exemplified by:

G00XXsZZs;

G120;

G03XXezzEIXoKZoFf;

G121;

where "G120" is the machining mode switching command to switch from the normal to the Swiss mode, and "G121" is machining mode switching command to switch from the Swiss machining mode to the normal.

If the machining mode switching commands "G120" and the "G121" are not present, the machining operation according to the machining program P is the same as that according to the normal mode described above by reference to FIG. 10 in the introductory part of this specification.

Figure 5:
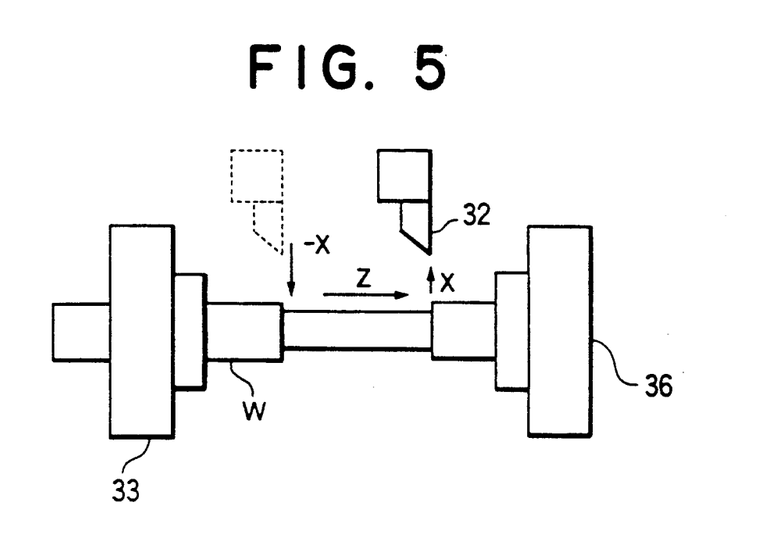
FIG. 5 shows the numerically controlled lathe operating in the normal mode.
Figure 6:
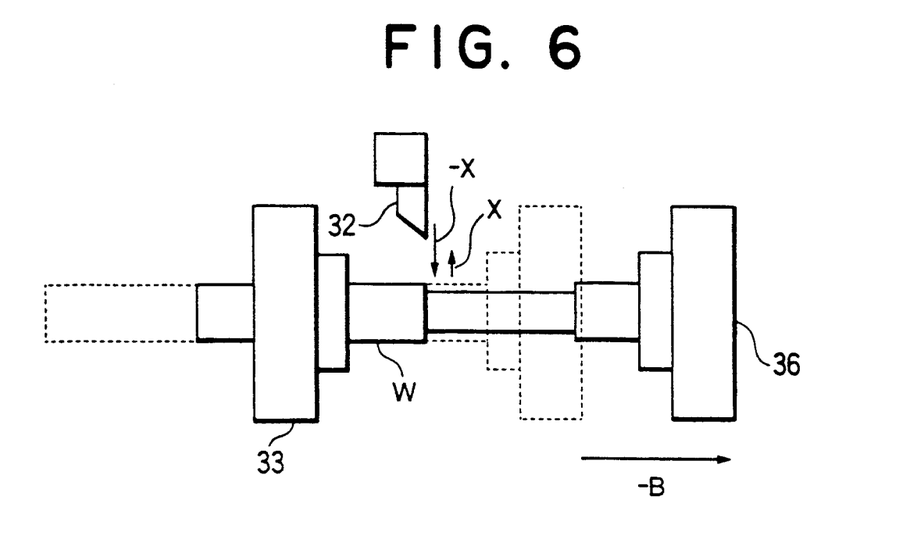
FIG. 6 shows the numerically controlled lathe operating in the Swiss machining mode.

By means of the numerically controlled lathe 1, the tool 32 can operated both in the normal machining mode and the Swiss machining mode. FIG. 5 shows the numerically controlled lathe operating in the normal mode. According to the normal mode, the tool 32 is translated along the X-axis and the Z-axis, while the work W remains stationary. On the other hand, FIG. 6 shows the numerically controlled lathe operating in the Swiss machining mode. When the machining is effected by the Swiss mode, the translation command described in the normal mode within the machining program P is subjected to axes conversion, such that, as shown in FIG. 6, the tool 32 is translated along the X-axis and the work W is translated along the B-axis to effect machining of the work W.

Thus, when there is little or no space for translating the work in order to effect machining according to the Swiss machining mode, the numerically controlled lathe is to be operated according to the normal mode. On the other hand, when there arises the problem that the work W is bent when machined via the normal mode, the work W is to be machined via the Swiss machining mode such that the tool 32 remains near the main spindle 33 during the machining operation. Even under this circumstance, the translation command in the machining program P may be described in the same manner as in the normal mode, which greatly alleviates the labor of programming. By the way, in the case of the above embodiment, the numerically controlled lathe is a complex machine by which the auxiliary spindle 36 is translated to move the work W. However, the present invention is applicable to complex machines by which the main spindle 33 is translated, or to simple machine tools provided with a single spindle which can be translated to move the work.

According to this invention, the translation commands for the tool, especially the arc commands, written in the normal operation mode can be automatically converted into interpolation data for respective axes according to the Swiss mode. Thus, the programming labor is alleviated. Further, since it becomes easier to combine the normal and the Swiss mode, a long word can be machined within a small space, or a higher machining precision can be accomplished by preventing the bending of the work.

What is claimed is:

1. Numerically controlled device operated by a machining program for controlling a numerically controlled machine tool which includes a tool translatable along a first and a second axis and by which a work is translatable along a third axis running parallel to the second axis, said machining program containing translation commands for translating the tool, and machining mode switching commands for switching between a first mode by which only the tool is translated along the first and the second axes, and a second mode by which the tool is translated along the first axis while the work is translated along the third axis, said numerical control device comprising:

program analyzer means for analyzing a machining program into said translation commands and said machining mode switching commands;

interpolation data generator means for generating translation data of the tool and/or the work along respective axes, said interpolation data generator means converting, in response to a machining mode switching command for switching from said first to said second mode, the translation commands for translating the tool along the first and the second axes into translation data of the tool along the first axis and the translation data of the work along the third axis, said interpolation data generator terminating the conversion upon receiving a machining mode switching command for switching from said second to said first mode; and driver means for driving the numerically controlled machine tool in accordance with the translation data obtained by said interpolation data generator.

2. A numerical control device as claimed in claim 1, wherein said machining program includes linear translation commands for translating the tool along a linear path, and arc movement commands for translating the tool along an arc.

3. A numerically controlled machine tool controlled by a numerical control device as claimed in claim 1, said numerically controlled machine tool having a tool translatable along a first and a second axis, wherein a work is translatable along a third axis running parallel to the second axis.

4. A numerically controlled machine tool as claimed in claim 3, wherein said numerically controlled machine tool is a numerically controlled lathe.

* * * * *